United States Patent
Lim et al.

(10) Patent No.: US 11,300,582 B2
(45) Date of Patent: Apr. 12, 2022

(54) WHEEL SPEED DETECTING DEVICE AND WHEEL BEARING ASSEMBLY COMPRISING SAME

(71) Applicant: ILJIN GLOBAL CO., LTD, Seoul (KR)

(72) Inventors: Jong Keun Lim, Seoul (KR); Hyeon Ung Shin, Seoul (KR)

(73) Assignee: ILJIN GLOBAL CO., LTD, Seoul (KR)

(*) Notice: Subject to any disclaimer, the term of this patent is extended or adjusted under 35 U.S.C. 154(b) by 82 days.

(21) Appl. No.: 16/838,608

(22) Filed: Apr. 2, 2020

(65) Prior Publication Data

US 2020/0249250 A1    Aug. 6, 2020

Related U.S. Application Data

(63) Continuation of application No. PCT/KR2018/011325, filed on Sep. 21, 2018.

(51) Int. Cl.
*G01P 3/44* (2006.01)
*G01P 3/487* (2006.01)

(52) U.S. Cl.
CPC .............. *G01P 3/443* (2013.01); *G01P 3/487* (2013.01)

(58) Field of Classification Search
CPC .................................. G01P 3/443; G01P 3/487
See application file for complete search history.

(56) References Cited

U.S. PATENT DOCUMENTS

| 5,938,346 A | * | 8/1999 | Ouchi | F16C 41/007 |
| | | | | 384/448 |
| 2013/0249273 A1 | * | 9/2013 | Norimatsu | F16C 33/723 |
| | | | | 301/109 |
| 2020/0023824 A1 | * | 1/2020 | Lim | B60T 8/171 |
| 2020/0101791 A1 | * | 4/2020 | Lim | F16C 19/186 |

FOREIGN PATENT DOCUMENTS

| JP | 2011174796 A | 9/2011 |
| KR | 100361306 B1 | 11/2002 |
| KR | 100842392 B1 | 7/2008 |
| KR | 1020090044718 A | 5/2009 |
| KR | 1020150129147 A | 11/2015 |

OTHER PUBLICATIONS

International Search Report for PCT/KR2018/011325 dated Jun. 19, 2019.

* cited by examiner

*Primary Examiner* — Reena Aurora
(74) *Attorney, Agent, or Firm* — Dinsmore & Shohl LLP; Yongsok Choi, Esq.

(57) ABSTRACT

One aspect of the present disclosure provides a wheel speed detecting device installable in a wheel bearing comprising an outer ring and an inner ring rotatable relative to the outer ring by rolling elements. The wheel speed detecting device may comprise a frame fixed on the inner ring so as to surround an outer circumference of the inner ring, a first target disposed along an outer circumference of the frame, a second target disposed at a central portion of the frame, and sensor configured to detect signals generated from each of the first target and the second target to measure rotational information of the inner ring.

20 Claims, 7 Drawing Sheets

WHEEL SPEED DETECTING DEVICE AND WHEEL BEARING ASSEMBLY COMPRISING SAME

CROSS-REFERENCE TO RELATED APPLICATION

This application is a continuation of International Application No. PCT/KR2018/011325 field on Sep. 21, 2018, the entire contents of which are herein incorporated by reference.

TECHNICAL FIELD

The present disclosure relates to a wheel speed detecting device and a wheel bearing assembly comprising the same.

BACKGROUND ART

In various vehicular application systems, such as an anti-lock brake systems (ABS) and the like, rotational speed and direction of a wheel are measured. For example, the ABS is a system for preventing a phenomenon that a wheel is completely locked by a brake during braking operation and as a result a vehicle body is overturned or skidded. According to such a purpose, rotational speed and direction of a wheel are measured by a wheel speed sensor. For example, the wheel speed sensor may comprise a target which is provided in the form of a ring on an inner ring of a bearing coupled to a rotating shaft of the wheel. The target is comprised of a number of magnetic pole pairs. In the wheel speed sensor having the above structure, rotational speed and direction of the wheel are measured on the basis of rotational speed and direction of the target, and the measurement accuracy is determined by the number of magnetic pole pairs.

SUMMARY

Technical Problem

In order to implement functions of a vehicle such as autonomous driving, automatic parking, and the like, accurate control of a wheel is required. To this end, it is required to more accurately measure rotational speed and direction of a wheel. However, there is a limitation on increase of the number of magnetic pole pairs in conventional wheel speed sensors.

The present disclosure is directed to providing a wheel speed detecting device and a wheel bearing assembly comprising the same, which resolves the above problems of the prior art and allow accurate control of a wheel.

Technical Solution

One aspect of the present disclosure provides a wheel speed detecting device which is installable in a wheel bearing comprising an outer ring and an inner ring rotatable relative to the outer ring by rolling elements. The wheel speed detecting device may comprise a frame fixed on the inner ring so as to surround an outer circumference of the inner ring; a first target disposed along an outer circumference of the frame; a second target disposed at a central portion of the frame; and sensor configured to detect magnetic fields induced from each of the first target and the second target.

According to one embodiment, the sensor may comprise a first sensor configured to detect a magnetic field induced from the first target; and a second sensor configured to detect a magnetic field induced from the second target and have a resolution that is higher than that of the first sensor.

According to one embodiment, the second target may have a cylindrical shape and may be concentrically disposed with the inner ring.

According to one embodiment, the first target may be formed of a rubber magnet in which rubber and magnetic material are mixed, and the magnetic material may include at least one among ferrite, neodymium (NdFeB) and samarium cobalt (Sm—Co).

According to one embodiment, a concave portion, which is bent toward the inner ring, may be formed at the central portion of the frame, and the second target may be fixed to the concave portion.

According to one embodiment, the second sensor may be concentrically disposed with the inner ring.

According to one embodiment, the first target may comprise a cylindrical portion fixed to the frame; and a flange portion formed to extend from the cylindrical portion so as to be perpendicular to the cylindrical portion.

According to one embodiment, the flange portion may comprise a plurality of unit targets, and the unit targets may be uniformly distributed on the flange portion.

According to one embodiment, the cylindrical portion may be formed of material having elasticity, and the cylindrical portion may be press-fitted to the frame.

According to one embodiment, an accommodation portion, which is bent toward the rolling elements for accommodating the cylindrical portion, may be further formed in the frame.

According to one embodiment, the accommodation portion may be formed at the outer circumference of the frame and may have a U-shape in a cross-sectional direction including a rotational axis of the inner ring.

According to one embodiment, a radially inner portion of the accommodation portion may be fixed on the inner ring.

According to one embodiment, the frame may further comprise a support portion extending from the accommodation portion in a radially outward direction of the frame so as to support an inner side of the flange portion.

According to one embodiment, the wheel speed detecting device may further comprise an insert coupled to the frame and configured to accommodate the second target.

According to one embodiment, an opening may be formed at the central portion of the frame, and a groove, into which a central end portion of the frame surrounding the opening is inserted, may be formed in the insert.

According to one embodiment, the first target may include ferrite material, and the second target may include neodymium material.

According to one embodiment, at least one opening may be formed in a region between the outer circumference of the frame and the central portion of the frame.

One aspect of the present disclosure provides a wheel bearing assembly comprising an outer ring; an inner ring relatively rotatable with respect to the outer ring by rolling elements; a frame fixed on the inner ring so as to surround an outer circumference of the inner ring; a plurality of targets fixed to the frame; and a plurality of sensors configured to detect a plurality of magnetic fields induced from each of the plurality of targets according to a rotation of the inner ring, wherein one sensor among a plurality of sensors may have a resolution that is higher than that of the other sensor.

According to one embodiment, the plurality of targets may comprise a first target disposed along an outer circumference of the frame and a second target disposed at a central portion of the frame, wherein the second target may be concentrically disposed with the inner ring.

According to one embodiment, the wheel bearing assembly may further comprise a cap fixed on the outer ring so as to surround an outer circumference of the outer ring. The sensors may comprise a first sensor configured to detect a magnetic field induced from the first target and a second sensor configured to detect a magnetic field induced from the second target and have a resolution that is higher than that of the first sensor. A fixing portion configured to concentrically dispose the second sensor with the second target may be formed at a central portion of the cap.

According to one embodiment, the magnetic field induced from the first target may have a frequency that is relatively higher than that of the magnetic field induced from the second target.

Advantageous Effects

In accordance with embodiments of the present disclosure, the wheel speed detecting device may provide a plurality of rotational information with different resolutions to allow accurate control of the wheel.

Further, in the wheel speed detecting device according to embodiments of the present disclosure, the first target and the second target can be firmly fixed to the frame which surrounds the inner ring of the wheel bearing. Wherein, since the first target may be made of elastic material, the frame can be substantially firmly fixed to the inner ring.

Further, in the wheel bearing assembly according to embodiments of the present disclosure, the first sensor and the second sensor can be firmly fixed to the cap, which surrounds the outer ring of the wheel bearing, so as to be disposed adjacent to the first target and the second target. Wherein, the first sensor and the second sensor can selectively detect speed information of the inner ring according to rotational speed of the inner ring.

DETAILED DESCRIPTION

Embodiments of the present disclosure are exemplified for the purpose of describing the technical spirit of the present disclosure. The scope of the claims according to the present disclosure is not limited to the embodiments described below or to the detailed descriptions on these embodiments.

Unless otherwise defined, all technical and scientific terms used herein have the same meaning commonly understood by those skilled in the art to which the present disclosure pertains. All terms used herein are selected for the purpose of more clearly describing the present disclosure and not limiting the scope of the present disclosure defined by appended claims.

Unless the phrase or sentence clearly indicates otherwise, terms "comprising," "including," "having," "taking," and the like used herein should be construed as open-ended terms encompassing the possibility of including other embodiments.

The singular form described herein may include the plural form unless the context clearly dictates otherwise, and this is equally applied to the singular form set forth in the claims.

Terms "first," "second," and the like are used to distinguish a plurality of components, and the order or importance of corresponding components is not limited by these terms.

Throughout the present disclosure, when a component is referred to as being "connected" to another component, the component can be directly connected to another component, or can be connected to another component by intervening yet another component therebetween.

Dimensions and numerical values described in the present disclosure are not limited only to the dimensions and numerical values described herein. Unless otherwise specified, these dimensions and numerical values will be understood to mean the values described herein and the equivalent ranges including the described values. For example, a numerical value of "60 km/h" described herein can be understood to include "about 60 km/h."

Hereinafter, embodiments of the present disclosure will be described with reference to the accompanying drawings. In the accompanying drawings, the same reference numerals are assigned to the same or corresponding components. Further, in the following descriptions of the embodiments, duplicate descriptions on the same or corresponding components may be omitted. However, even though a description on a component is omitted, such a component is not intended to be excluded in any embodiment.

Figure 1:
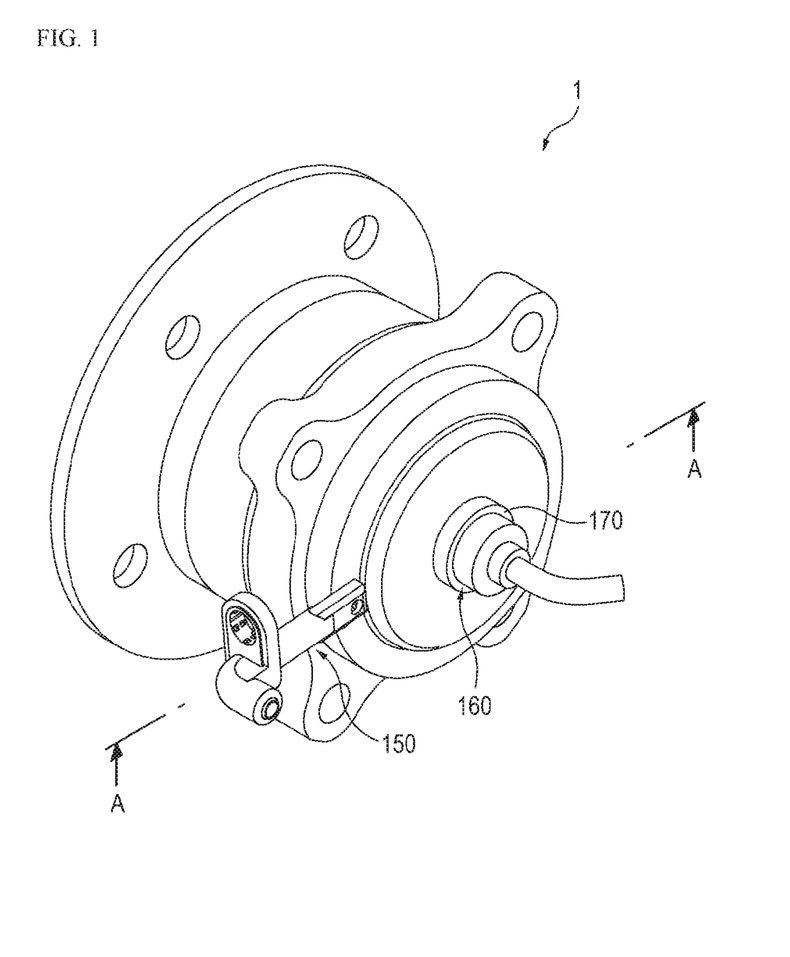
FIG. 1 is a perspective view illustrating a wheel bearing assembly according to one embodiment of the present disclosure.
Figure 2:
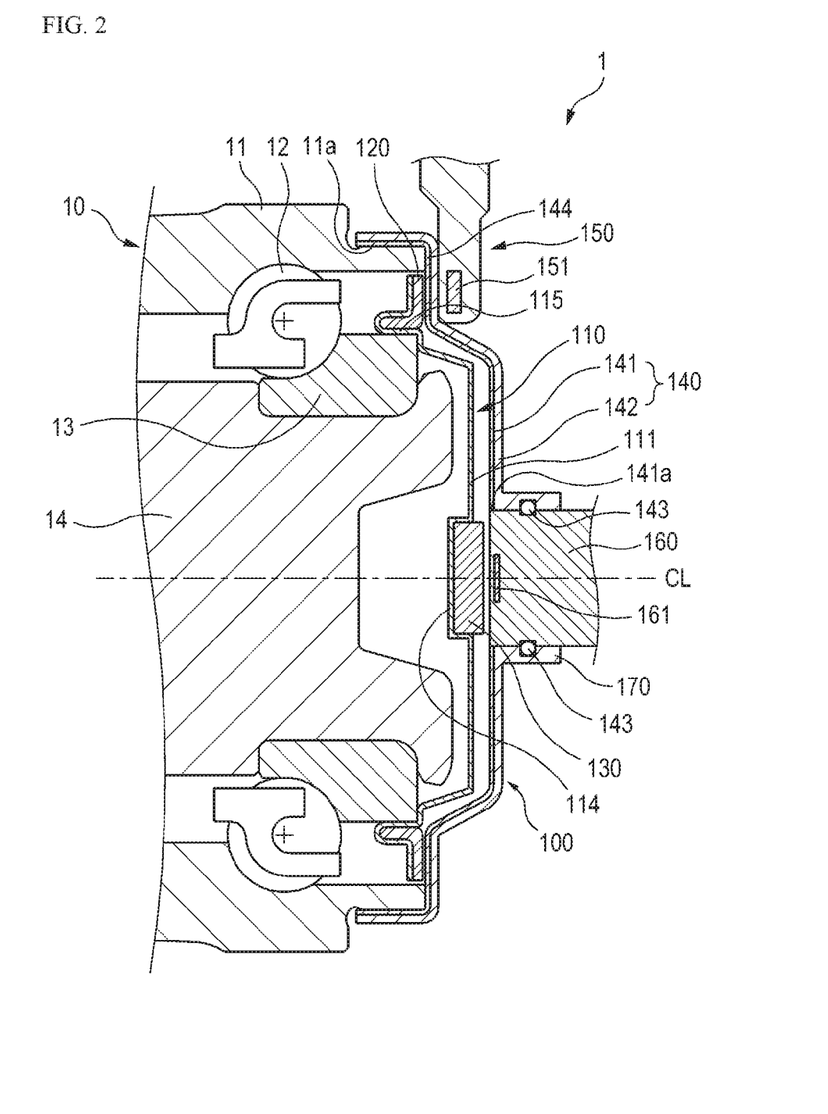
FIG. 2 is a cross-sectional view of the wheel bearing assembly taken along line A-A shown in FIG. 1.

FIG. 1 is a perspective view illustrating a wheel bearing assembly 1 according to one embodiment of the present disclosure, and FIG. 2 is a cross-sectional view of the wheel bearing assembly 1 taken along line A-A shown in FIG. 1.

The wheel bearing assembly 1 may comprise a wheel bearing 10 and a wheel speed detecting device 100 installed in the wheel bearing 10. The wheel bearing assembly 1 shown in FIG. 1 may be installed between a vehicle body and a wheel of a vehicle, and the wheel speed detecting device 100 may measure rotational speed, rotational direction, rotational angle and the like of a wheel.

The wheel bearing 10 may comprise an outer ring 11 fixed to the vehicle body, rolling elements 12, and an inner ring 13 which is rotatable relative to the outer ring 11 by the rolling elements 12. The inner ring 13 may be press-fitted to and fixed on a wheel hub 14, and the wheel may be coupled to the wheel hub 14.

The wheel speed detecting device 100 may comprise a frame 110, a first target 120, a second target 130 and sensors 150 and 160. The frame 110 may be press-fitted to and fixed on the inner ring 13 so as to surround an outer circumference of the inner ring 13. Accordingly, as the inner ring 13 is rotated, the frame 110, the first target 120 and the second target 130 are also rotated together the inner ring 13. Although two targets are provided in FIG. 2, the present disclosure is not limited thereto, and a plurality of targets exceeding the two targets may be also provided. The first target 120 may be disposed along an outer circumference 115 of the frame 110, and the second target 130 may be disposed at a central portion 111 of the frame 110. A concave portion 114 which is bent toward the inner ring 13 may be formed at the central portion 111 of the frame 110, and the second target 130 may be press-fitted into and fixed to the concave portion 114.

The sensors 150 and 160 may comprise a first sensor 150 configured to detect a magnetic field induced from the first target 120 which is rotated together with the inner ring 13 and a second sensor 160 configured to detect a magnetic field induced from the second target 130 which is rotated together with the inner ring 13. The second sensor 160 may have a resolution (e.g., a magnetic field resolution) that is higher than that of the first sensor 150. The sensors 150 and 160 may comprise detectors 151 and 161 for detecting the magnetic field induced from the targets 120 and 130 when the inner ring 13 is rotated.

The wheel speed detecting device 100 may be provided with a cap 140 fixed on the outer ring 11 to surround an outer circumference of the outer ring 11 of the wheel bearing 10. The second sensor 160 may be disposed at a position adjacent to the second target 130 by the cap 140. The cap 140 may be made of plastic or nonmagnetic metal (e.g., stainless steel). When the cap 140 is made of nonmagnetic metal, the cap 140 may be manufactured by pressing or punching a thin plate-shaped metal material.

The first sensor 150 may be disposed outside of the cap 140, and the first sensor 150 may be disposed at a position adjacent to an outer circumference 144 of the cap 140 so as to be disposed adjacent to the first target 120. A longitudinal direction of the first sensor 150 may have a direction toward a center of the cap 140 from a knuckle of the vehicle.

In one embodiment, the cap 140 may be comprised of two layers made of different materials and may comprise a first cap 141 and a second cap 142 disposed outside of the first cap 141. For example, the first cap 141 may be made of metal material, and the second cap 142 may be made of plastic material.

The cap 140 may be coupled to the wheel bearing 10 through the following steps. First, the first cap 141 may be air-tightly or water-tightly coupled to the outer ring 11 by press-fitting the first cap 141 to an outer circumferential surface 11a of the outer ring 11. Next, the second sensor 160 may be inserted into an opening 141a formed in the first cap 141. In one embodiment, a center of the opening 141a may be concentrically disposed with a center of the second target 130. Accordingly, a center of the second sensor 160 inserted into the opening 141a may be concentrically disposed with the center of the second target 130. Next, the second cap 142 may be insert molded on the first cap 141 and the second sensor 160. Further, while the second cap 142 is insert molded, a fixing portion 170 of surrounding a periphery of the second sensor 160 may be formed at a central portion of the second cap 142.

The second cap 142 may be configured to surround an entirety of an outer circumference of the first cap 141. Since an inner surface of the second cap 142 is injected over an entirety of an outer surface of the first cap 141, even when a weight of the second sensor 160 is large, the fixing portion 170 of the second cap 142 may have a sufficient supporting force and a sagging phenomenon of the second sensor 160 toward the ground may be prevented. Further, since the second cap 142 is formed by being injected onto the first cap 141, an air gap between the second sensor 160 and the second target 130 (i.e., an axial gap between the second sensor 160 and the second target 130) can be constantly maintained.

In one embodiment, a fixing member 143 for fixing the second sensor 160 to the fixing portion 170 may be provided between the fixing portion 170 and the second sensor 160. Therefore, even when the inner ring 13 is rotated, the position of the second sensor 160 may be stably fixed by the fixing member 143.

When the frame 110 is used, the first and second targets 120 and 130 may be fixed on the inner ring 13 of the wheel bearing 10 without any additional fixing means. Specifically, when the first target 120 is fixed on the outer circumference 115 of the frame 110, the second target is fixed in the concave portion 114 of the frame 110, and then the frame 110 is fixed on the inner ring 13, the first and second targets 120 and 130 may be also fixed on the inner ring 13. Therefore, owing to the frame 110, convenience of an installation work of the first and second targets 120 and 130 may be improved.

Figure 3:
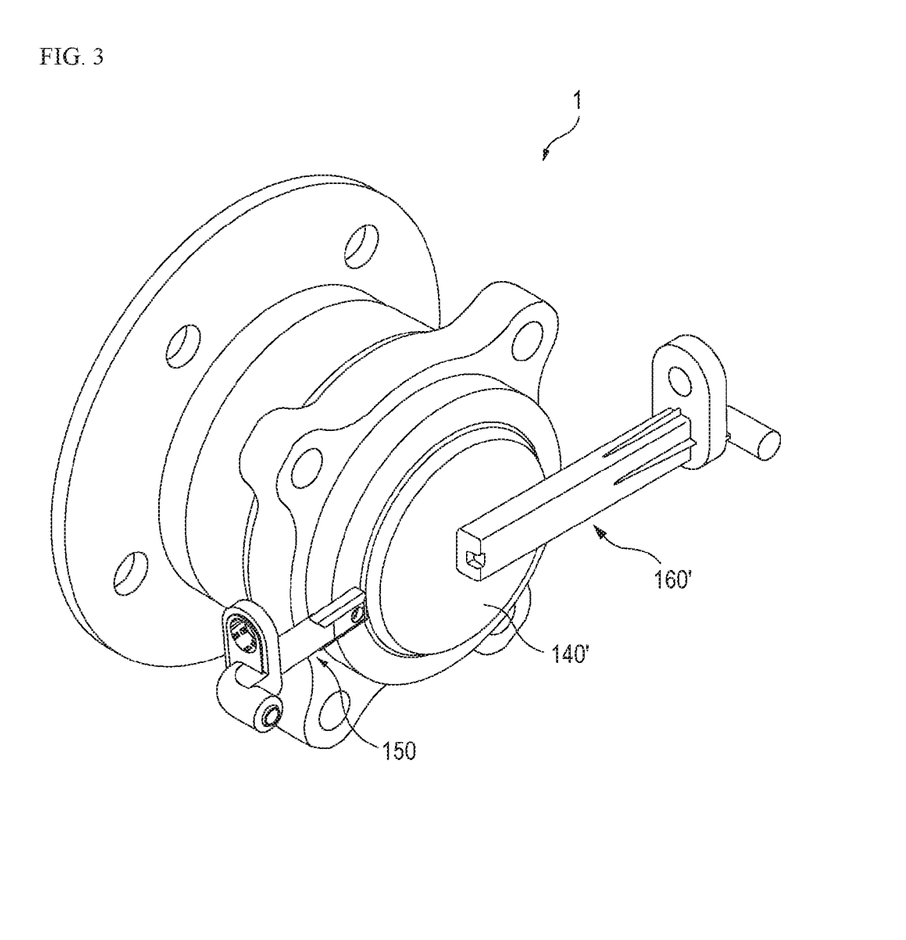
FIG. 3 is a perspective view illustrating a wheel bearing assembly according to one embodiment of the present disclosure.

FIG. 3 is a perspective view illustrating a wheel bearing assembly 1' according to one embodiment of the present disclosure. With regard to the wheel bearing assembly 1', the descriptions will be made to focus on the differences from the wheel bearing assembly 1 according to one embodiment described above. The features indicated by the same term can be understood to have the same function.

Unlike the embodiment in which the cap is formed with two layers, a cap 140' of the wheel bearing assembly 1' may be formed with a single layer and may be formed of metal material. The first sensor 150 and a second sensor 160' may not be press-fitted and fixed to the cap 140' but may be assembled outside of the cap 140'. The first sensor 150 and the second sensor 160' may have a rod shape and may be disposed perpendicular to the wheel hub 14 of the wheel bearing shown in FIG. 2. In one embodiment, longitudinal directions of the first sensor 150 and the second sensor 160' may be disposed in parallel and may be disposed on one straight line.

One end of the second sensor 160' may be coupled to a portion of the vehicle body such as a knuckle, and the other end thereof may be disposed adjacent to a center of the wheel hub 14 of the wheel bearing shown in FIG. 2. A detector of the second sensor 160' may be located near the other end of the second sensor 160' so as to be concentrically disposed with the wheel hub 14 of the wheel bearing.

Figure 4:
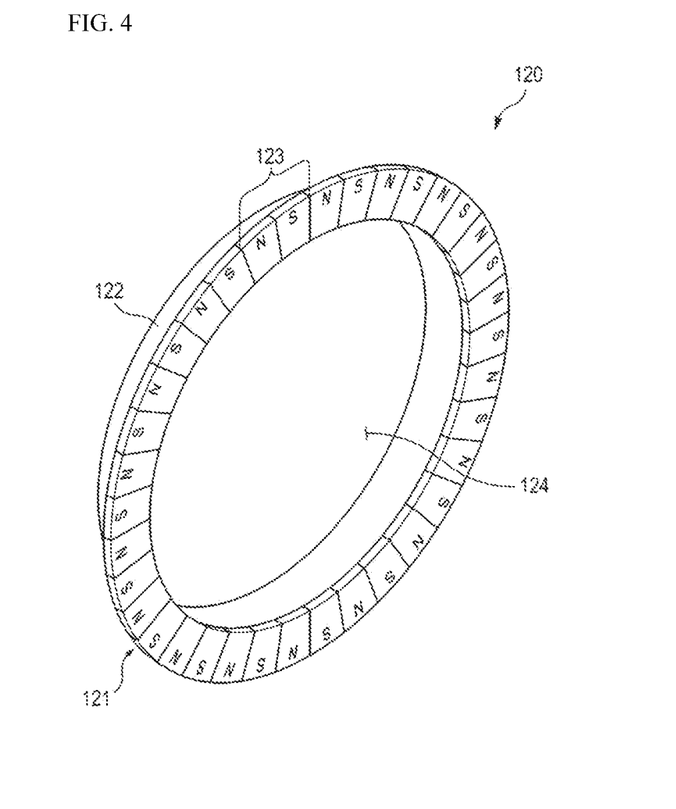
FIG. 4 is a perspective view illustrating the first target shown in FIG. 2.
Figure 5:
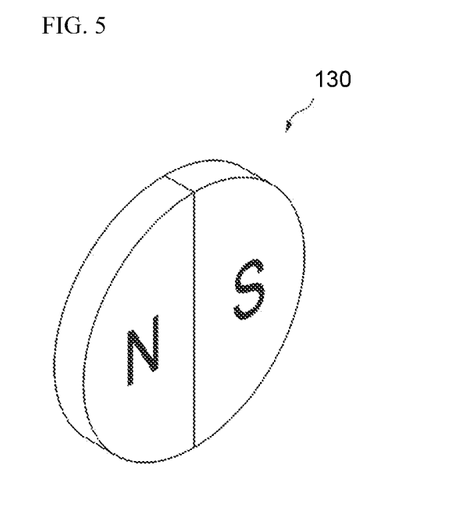
FIG. 5 is a perspective view illustrating the second target shown in FIG. 2.

FIG. 4 is a perspective view illustrating the first target 120 shown in FIG. 2, and FIG. 5 is a perspective view illustrating the second target 130 shown in FIG. 2.

The first target 120 may be a rubber magnet including magnetic material. The second target 130 may also be a rubber magnet like the above. In one embodiment, the second target 130 may be a substantially rigid magnet including magnetic material. The magnetic material of the first and second targets 120 and 130 may be at least one among ferrite, neodymium (NdFeB) and samarium cobalt (Sm—Co). Further, the magnetic material of the first and second targets 120 and 130 may be neodymium.

The material of the first target 120 may have elasticity and may be deformed to a predetermined level. The first target 120 may be coupled to the frame 110 by insert-injecting a molten rubber magnetic raw material onto the frame 110. When both the first and second targets 120 and 130 are rubber magnets, the first and second targets 120 and 130 may be simultaneously insert injected onto the frame 110, and thus two targets may be fixed on the frame 110 in one process.

The first target 120 may comprise a cylindrical portion 122 and a flange portion 121 formed to extend from one end of the cylindrical portion 122 in a radially outward direction of the cylindrical portion 122. The cylindrical portion 122 may be formed parallel to a central line CL of the wheel hub 14 shown in FIG. 2 and may have a cylindrical wall shape. The flange portion 121 may have a ring shape generally perpendicular to the cylindrical portion 122.

A hollow 124 of passing through centers of the cylindrical portion 122 and the flange portion 121 may be formed. The inner ring 13 and the wheel hub 14 of the wheel bearing 10 shown in FIG. 2 may pass through the hollow 124.

The flange portion 121 may comprise a plurality of unit targets 123, and the plurality of unit targets 123 may form a generally ring shape. Each of the unit targets 123 may have magnetic pole pairs comprised of one N pole and one S pole. For example, 48 unit targets 123 may be provided and distributed uniformly along the flange portion 121 of the first target 120. As shown in FIG. 3, the unit targets 123 may be formed over an entirety of the flange portion 121 based on a circumferential direction. In one embodiment, the unit targets 123 may be formed on only a portion of the flange portion 121.

The second target 130 may have a disc shape (e.g., a coin-like shape). The second target 130 may have a magnetic pole pair comprised of one N pole and one S pole and may substantially form one unit target.

Figure 6:
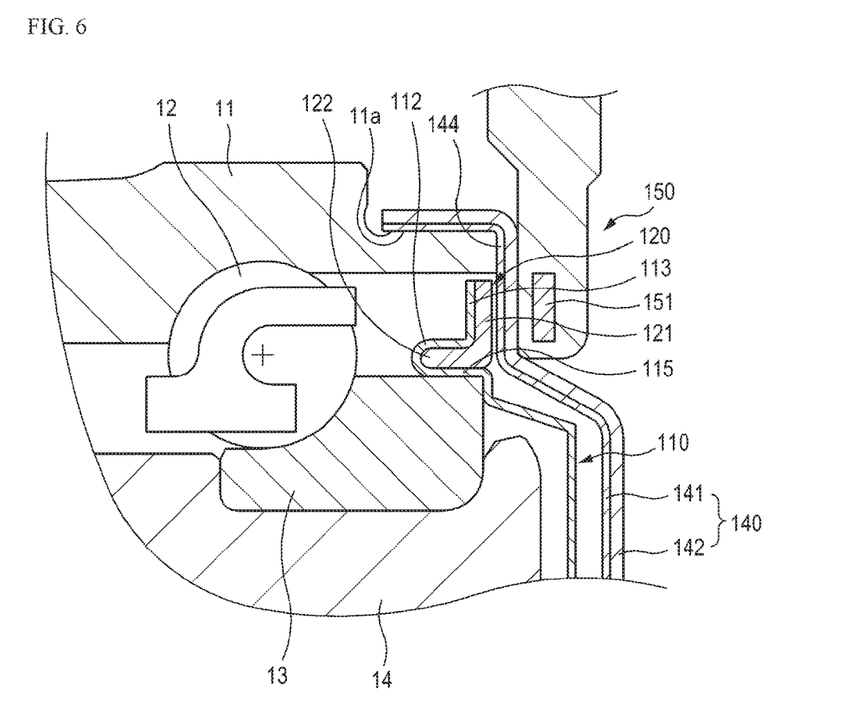
FIG. 6 is an enlarged cross-sectional view of the portion in which the first target is disposed in the wheel bearing assembly shown in FIG. 2.

FIG. 6 is an enlarged cross-sectional view of the portion in which the first target 120 is disposed in the wheel bearing assembly 1 shown in FIG. 2.

At least a portion of the cylindrical portion 122 of the first target 120 may be press-fitted and inserted to the frame 110. In this case, since the first target 120 has elasticity as described above, the cylindrical portion 122 may be inserted to the frame 110 while being compressed.

In order to accommodate the cylindrical portion 122, the frame 110 may comprise an accommodation portion 112 which is bent toward the rolling elements 12. The accommodation portion 112 may be formed at the outer circumference 115 of the frame 110. The accommodation portion 112 may have a U shape in a cross-sectional direction including the central line CL of the inner ring 13 or the wheel hub 14 of the wheel bearing 10 shown in FIG. 2.

In order to support an inner side of the flange portion 121, the frame 110 may further comprise a support portion 113 extending from the accommodation portion 112 in a radially outward direction of the frame. That is, the first target 120 may be supported by the accommodation portion 112 in a radial direction of the first target 120 and may be supported by the flange portion 121 in a direction parallel to the central line CL of the wheel bearing 10 shown in FIG. 2. Since the first target 120 is supported by the frame 110 in the radial direction and the axial direction, the first target 120 may be firmly supported so as to not be separated from the frame 110.

A radially inner portion of the accommodation portion 112 may be fixed on the inner ring 13. Since the cylindrical portion 122 of the first target 120 having elasticity is inserted in the accommodation portion 112, a restoring force of the cylindrical portion 122 may act as a force of pressing the accommodation portion 112 in the radially inward direction. Since the cylindrical portion 122 substantially provides a fixing force with respect to the frame 110, the frame 110 may be firmly fixed on the inner ring 13 as compared with a case in which the cylindrical portion 122 is not provided.

Since the first target 120 is supported by the frame 110 in the axial direction, it is possible to prevent separation of the first target 120 from the frame 110 in the axial direction. Further, a contact area between the first target 120 and the frame 110 increases such that the magnetic force of the first target 120 may be increased.

Figure 7:
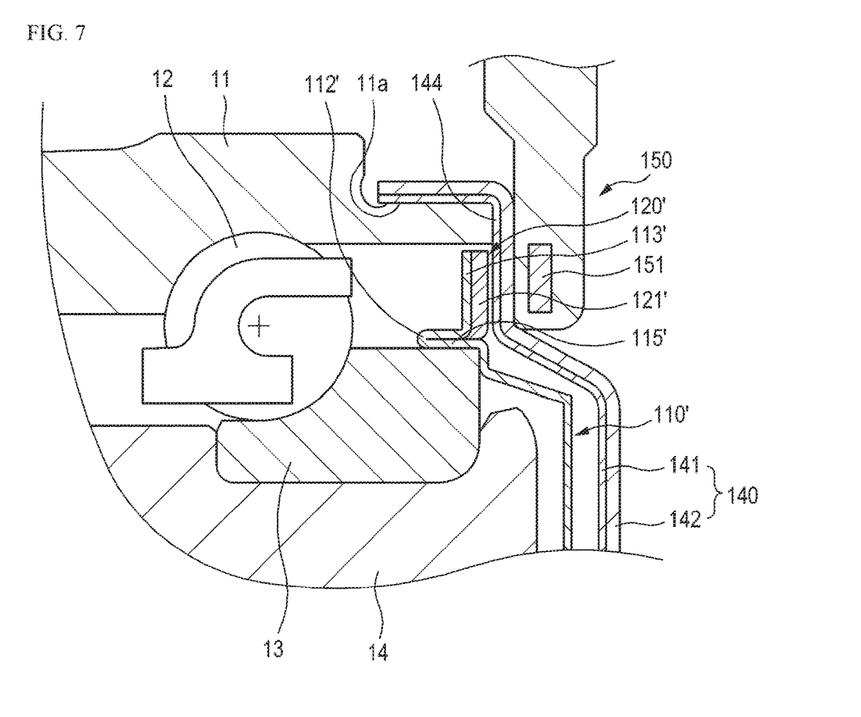
FIG. 7 is a cross-sectional view illustrating an embodiment having a configuration different from that of the embodiment shown in FIG. 6.

FIG. 7 is a cross-sectional view illustrating an embodiment having a configuration different from that of the embodiment shown in FIG. 6. Hereafter, the descriptions on the features overlapping with those described in FIGS. 1 to 5 will be omitted, and the descriptions will be made to focus on the differences of the embodiment shown in FIG. 6.

A folded portion 112' which is bent toward the rolling elements 12 and a support portion 113' extending from the folded portion 112' may be formed on an outer circumference 115' of a frame 110'. The folded portion 112' may be formed as the configuration that the frame 110' is completely folded and may have a U shape. Such a U shape does not have a gap therein.

A first target 121' may be attached to the support portion 113'. The first target 121' may be insert injected on the support portion 113'. Since the folded portion 112' does not have an empty space, the first target 121' is not inserted thereinto.

A radially inner portion of the folded portion 112' may be fixed on the inner ring 13. In this case, since the first target 121' does not provide any fixing force, a tensile force of the frame 110' may act as a fixing force between the frame 110' and the inner rings 13.

Figure 8:
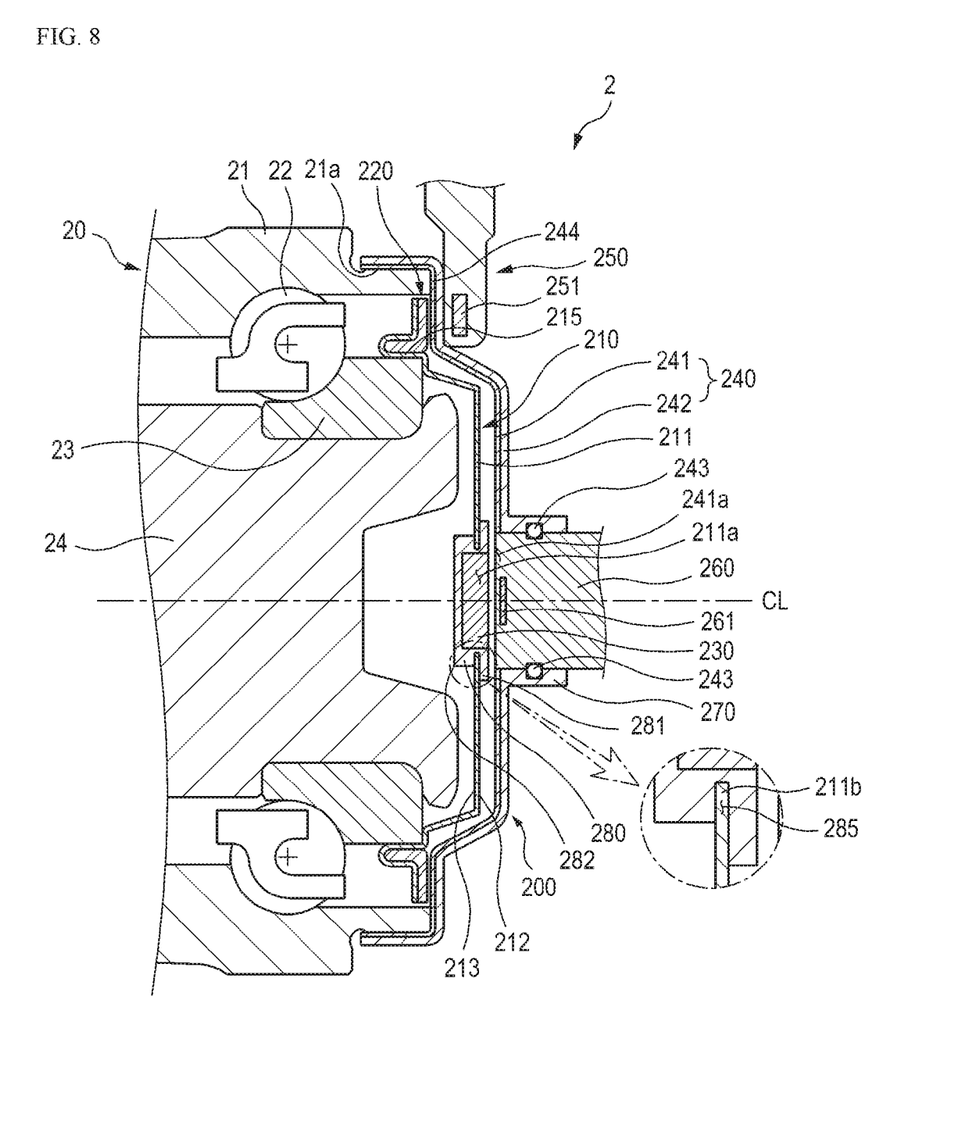
FIG. 8 is a perspective view illustrating a wheel bearing assembly according to one embodiment of the present disclosure.

FIG. 8 is a perspective view illustrating a wheel bearing assembly 2 according to one embodiment of the present disclosure. Duplicate descriptions on the features described in the above embodiments will be omitted herein.

The wheel bearing assembly 2 may comprise a wheel bearing 20 and a wheel speed detecting device 200 installed in the wheel bearing 20. The wheel bearing 20 may comprise an outer ring 21, rolling elements 22, an inner ring 23 and a wheel hub 24 to which the inner ring 23 are press-fitted and fixed. The wheel speed detecting device 200 may comprise a frame 210, a first target 220, a second target 230, and first and second sensors 250 and 260. The first target 220 may be disposed along an outer circumference 215 of the frame 210, and the second target 230 may be disposed at a central portion 211 of the frame 210. The first sensor 250 may detect a magnetic field induced from the first target 220, and the second sensor 260 may detect a magnetic field induced from the second target 230. The first and second sensors 250 and 260 may comprise detectors 251 and 261 for detecting the magnetic fields induced from the targets 220 and 230 when the inner ring 23 is rotated. The second sensor 260 may have a resolution that is higher than that of the first sensor 250.

The wheel speed detecting device 200 may be provided with a cap 240 fixed on the outer ring 21 to surround an outer circumference of the outer ring 21. Owing to the cap 240, the second sensor 260 may be disposed at a position adjacent to the second target 230. The cap 240 may comprise a first cap 241 and a second cap 242 disposed outside of the first cap 241. For example, the first cap 241 may be made of metal material, and the second cap 242 may be made of plastic material.

The second sensor 260 may be coupled to the frame 210 by the following configurations. First, the second sensor 260 may be inserted into an opening 241a formed in the first cap 241. Then, while the second cap 242 is insert molded, a fixing portion 270 of surrounding a periphery of the second sensor 260 may be formed at a central portion of the second cap 242. Further, a fixing member 243 for fixing the second sensor 260 to the fixing portion 270 may be provided between the fixing portion 270 and the second sensor 260.

The frame 210 may further comprise an insert 280 coupled to the frame 210 and configured to accommodate the second target 230. An opening 211a may be formed at the central portion 211 of the frame 210, and the insert 280 may be disposed to be inserted into the opening 211a. The second target 230 may be inserted into an accommodation space formed by the insert 280. A surface of the second target 230 facing the axially outboard direction may be in contact with the insert 280, and a surface of the second target 230 facing the axially inboard direction may be toward the second sensor 260.

A groove 285, into which a central end portion 211b of the frame 210 that surrounds the opening 211a is inserted, may be formed on an outer circumference of the insert 280. The insert 280 may comprise a first insert portion 281 in contact with an axially inboard end surface 212 of the frame 210 and a second insert portion 282 in contact with an axially outboard end surface 213 of the frame 210. The groove 285 may be formed between the first insert portion 281 and the second insert portion 282 based on the axial direction. Accordingly, the central end portion 211b of the frame 210 is inserted into the outer circumference of the insert 280, and thus even when the wheel hub 24 is rotated at a high speed, the insert 280 is not separated from the frame 210.

The first target 220 and the second target 230 may be formed of different materials. As described above, the first target 220 may be a rubber magnet including ferrite material. In the present embodiment, the second target 230 may be a rigid magnet including neodymium material.

The ferrite material has a characteristic in which a magnetic property is amplified when in contact with metal material. In contrast, the neodymium material has a characteristic in which a magnetic property is decreased when in contact with metal material. Accordingly, if the second target 230 is made of neodymium material, when the second target 230 is in direct contact with the frame 210 made of metal material, an output of a signal generated from the second target 230 may be reduced and there is a probability in that accuracy of a signal detected by the second sensor 260 may be degraded. Therefore, instead of the frame 210 being in direct contact with the second target 230 made of neodymium material, the insert 280 may be inserted between the frame 210 and the second target 230 to prevent a direct contact therebetween.

Figure 9:
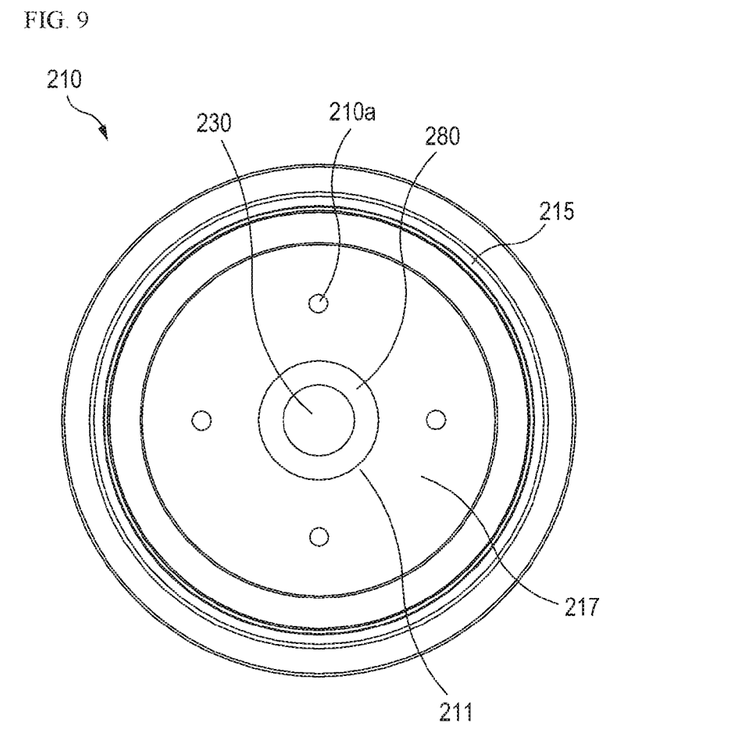
FIG. 9 is a diagram illustrating the frame of the wheel bearing assembly shown in FIG. 8 when viewed from a front side.

FIG. 9 is a diagram illustrating the frame 210 of the wheel bearing assembly 2 shown in FIG. 8 when viewed from a front side.

At least one opening 210a may be formed in a region 217 between the outer circumference 215 and the central portion 211 of the frame 210. At least one opening 210a may be provided as a plurality of openings 210a in a circumferential direction of the region 217. When the frame 210 is coupled to an outer circumference of the inner ring 23, the opening 210a may allow air between the frame 210 and the wheel hub 24 to be discharged.

If the frame 210 have no opening 210a, when the frame 210 is coupled to the outer circumference of the inner ring 23, a phenomenon that the frame 210 is swollen in the axial direction may occur. In this case, the position of the insert 280 coupled to the frame 210 may be displaced, and accuracy of a signal transmitted from the second target 230 to the second sensor 260 may be degraded. In contrast, since the frame 210 of the present embodiment has the opening 210a, when the frame 210 is coupled to the outer circumference of the inner ring 23, a deformation of the frame 210 may be prevented and the second target 230 may be accurately arranged in front of the second sensor 260.

Figure 10:
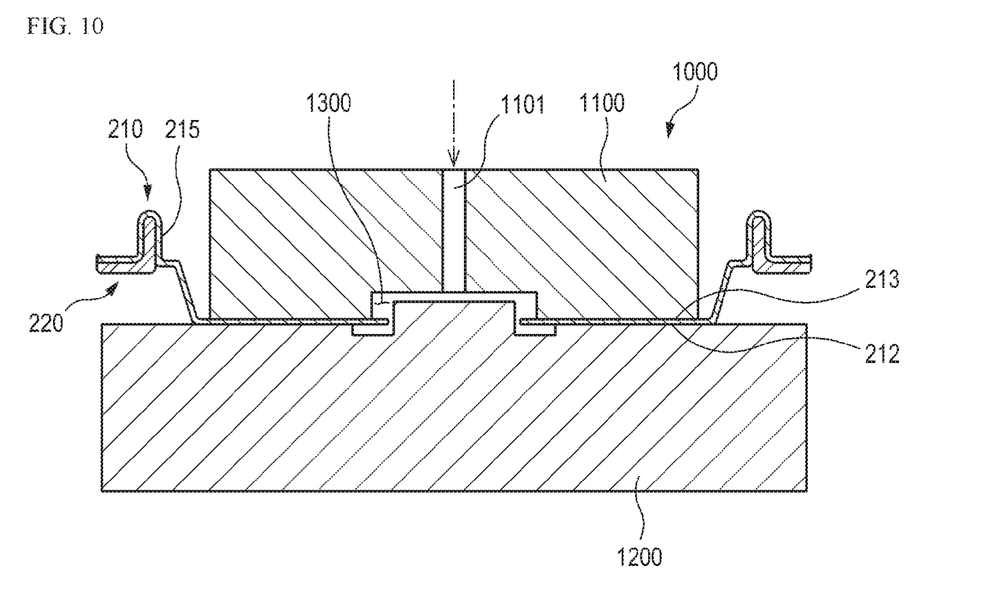
FIG. 10 is a cross-sectional view for illustrating a process of forming an insert to the frame shown in FIG. 8.

FIG. 10 is a cross-sectional view for illustrating a process of forming the insert 280 to the frame 210 shown in FIG. 8. The insert 280 may be formed by being insert-injected on the frame 210. A process of insert-injecting the insert 280 on the frame 210 may be performed as follows.

A mold 1000 for insert-injection may comprise an upper mold 1100 and a lower mold 1200. An injection path 1101 may be formed in the upper mold 1100 such that plastic injection material is injected in an arrow direction. In a state in which the upper mold 1100 is seated on the lower mold 1200, a cavity 1300 having a shape corresponding to the insert 280 may be formed therein.

First, the first target 220 is coupled to the outer circumference 215 of frame 210. Next, the frame 210, to which the first target 220 is coupled, may be disposed on the lower mold 1200. In this case, the axially inboard end surface 212 of the frame 210 may be in contact with an upper surface of the lower mold 1200. Next, the upper mold 1100 may be disposed on the lower mold 1200, and the upper mold 1100 and the lower mold 1200 may be coupled. In this case, the axially outboard end portion 213 of the frame 210 may be in contact with a lower surface of the upper mold 1100. Next, when molten injection material is injected into the injection path 1101 in the arrow direction, the injection material moves into the cavity 1300 to fill the cavity 1300. In this state, when a certain period of time is elapsed, the injection material hardens and thus the insert 280 hardens. Next, when the mold 1000 is separated, the frame 210 is taken out, and then the portion of the injection material corresponding to the injection path 1101 is removed, a manufacture of the insert 280 is completed.

Hereinafter, an operation process of the wheel speed detecting device 100 according to the present disclosure will be described with reference to FIG. 2.

The detector 151 of the first sensor 150 may detect a variation in magnetic pole of the first target 120 according to a rotation of the inner ring 13. The first sensor 150 may be configured to detect a magnetic field induced from the first target 120 and output a strength value of the detected magnetic field. While the first target 120 is rotated one turn together with the inner ring 13, the magnetic poles formed in the first target 120 are varied with a plurality of periods, and the detector 151 of the first sensor 150 detects a period and strength of the magnetic field to generate a pulse-shaped signal such that an electronic control unit (ECU) generates information on rotational speed of the inner ring 13.

In one embodiment, the first sensor 150 may operate in a manner similar to that of conventional wheel speed sensors. Under such an operating principle, a resolution of the first sensor 150 may be determined on the basis of the number of poles of a magnet in the first sensor 150. Assuming that the first target 120 has five pairs of N poles and S poles, sinusoidal electrical signals of five periods in total may be output while the first target 120 is rotated one turn, and thus it is possible to measure rotational speed of a wheel with a resolution of 72 degrees (=360 degrees/5) using the first sensor 150. Since the first target 120 mounted on the inner ring 13 generally has 43 to 80 magnetic pole pairs in a vehicular wheel rotation speed measuring system, the first sensor 150 can measure rotational speed of a vehicular wheel and output an electric signal with a resolution ranging from about 3 to 8 degrees.

The second sensor 160 may comprise the detector 161 for detecting a variation in magnetic pole of the second target 130 according to the rotation of the inner ring 13. In order to detect a variation in magnetic field of the second target 130 according to the rotation of the inner ring 13, the detector 161 of the second sensor 160 may comprise an element using at least one among Hall effect, AMR (Anisotropic Magneto Resistance) effect, GMR (Giant Magneto Resistance) effect and TMR (Tunnel Magneto Resistance) effect.

According to one embodiment, the detector 161 of the second sensor 160 may measure a voltage which is varied according to a current applied to a magnetic body or measures a resistance value of a magnetic body, which is varied according to the magnetic field induced by an AMR, GMR, or TMR effect, such that an strength value of the magnetic field induced to the magnetic body may be measured.

When the second target 130 is rotated one turn together with the inner ring 13, the magnetic field generated from the second target 130 is varied with a period. The second sensor 160 is configured to generate a pulse-shaped signal on the basis of the period and the strength of the magnetic field detected by the detector 161, and the ECU of the vehicle is configured to generate information on rotational angle, rotational speed and rotational direction of the inner ring 13 on the basis of the generated pulse-shaped signal.

Alternatively, the detector 161 of the second sensor 160 may be configured to detect a variation in magnetic field to generate a signal and then directly generate information on rotational angle, rotational speed and rotational direction of the inner ring 13 on the basis of the generated signal. For example, a processor, which generates information on rotational angle, rotational direction and rotational speed of the inner ring 13 on the basis of a signal received from the detector 161 of the second sensor 160, may be further provided. Further, the detector 161 and the processor may be configured as an integrated circuit (IC) chip.

Hereinafter, the procedure that the ECU of the vehicle applies different information processing processes according to high speed driving or low speed driving of the vehicle will be described.

For example, in the present disclosure, it may be assumed that a low speed of the vehicle is less than about 60 Km/h and a high speed thereof is equal to or greater than 60 Km/h. A criterion for these low and high speeds may be set variously according to requirements of the vehicle.

In one embodiment, the ECU of the vehicle may be configured to generate information on rotational angle, rotational speed and rotational direction of the inner ring 13 on the basis of the signal from the second sensor 160, and simultaneously, generate rotational information on rotational speed of the inner ring 13 on the basis of the signal from the first sensor 150, while the vehicle is driving at a low speed. In contrast, the ECU may be configured to generate rotational information on rotational speed of the inner ring 13 on the basis of the signal from the first sensor 150, while the vehicle is driving at a high speed.

Specifically, when the vehicle is driving at a low speed, the information on rotational angle, rotational speed and rotational direction of the inner ring 13, which is generated on the basis of the signal from the second sensor 160, may be used for accurate wheel control for autonomous driving, automatic parking, and the like. Simultaneously, the information on rotational speed of the inner ring 13, which is generated on the basis of the signal from the first sensor 150, may be used for wheel speed control for ABS.

Further, when the vehicle is driving at a high speed, without rotational information on the basis of the signal from the second sensor 160, only rotational speed of the inner ring 13, which is on the basis of the signal from the first sensor 150, may be measured, and such a rotational information may be used for wheel speed control for ABS. This is to save a time required to generate accurate rotational information (i.e., rotational angle) on the basis of the signal from the second sensor 160 and to reduce a load on the ECU.

Although the technical spirit of the present disclosure has been described by way of some embodiments and examples shown in the accompanying drawings, it should be noted that various substitutions, modification and alterations can be devised by those skilled in the art to which the present disclosure pertains without departing from the technical spirit and scope of the present disclosure. Further, it should be construed that these substitutions, modifications and variations are included within the scope of the appended claims.

What is claimed is:

1. A wheel speed detecting device installable in a wheel bearing comprising an outer ring and an inner ring rotatable relative to the outer ring, the wheel speed detecting device comprising:
    a frame fixed on the inner ring so as to surround an outer circumference of the inner ring;
    a first target disposed along an outer circumference of the frame;
    a second target disposed at a central portion of the frame; and
    sensor configured to detect magnetic fields induced from the first target and the second target according to a rotation of the inner ring.

2. The wheel speed detecting device of claim 1, wherein the sensor comprises:
    a first sensor configured to detect a magnetic field induced from the first target; and
    a second sensor configured to detect a magnetic field induced from the second target and have a resolution that is higher than that of the first sensor.

3. The wheel speed detecting device of claim 2, wherein the second target has a cylindrical shape and is concentrically disposed with the inner ring.

4. The wheel speed detecting device of claim 1, wherein:
    the first target is formed of a rubber magnet in which rubber and magnetic material are mixed, and
    the magnetic material includes at least one among ferrite, neodymium (NdFeB) and samarium cobalt (Sm—Co).

5. The wheel speed detecting device of claim 1, wherein:
    a concave portion, which is bent toward the inner ring, is formed at the central portion of the frame, and
    the second target is fixed to the concave portion.

6. The wheel speed detecting device of claim 1, wherein the first target comprises:
    a cylindrical portion fixed to the frame; and a flange portion formed to extend from the cylindrical portion so as to be perpendicular to the cylindrical portion.

7. The wheel speed detecting device of claim 6, wherein:
the flange portion comprises a plurality of unit targets, and
the unit targets are uniformly distributed on the flange portion.

8. The wheel speed detecting device of claim 6, wherein:
the cylindrical portion is made of material having elasticity, and
the cylindrical portion is press-fitted to the frame.

9. The wheel speed detecting device of claim 6, wherein an accommodation portion, which is bent for accommodating the cylindrical portion, is formed in the frame.

10. The wheel speed detecting device of claim 9, wherein the accommodation portion is formed at the outer circumference of the frame and has a U shape in a cross-sectional direction including a rotational axis of the inner ring.

11. The wheel speed detecting device of claim 9, wherein a radially inner portion of the accommodation portion is fixed on the inner ring.

12. The wheel speed detecting device of claim 9, wherein the frame further comprises a support portion extending from the accommodation portion in a radially outward direction of the frame so as to support an inner side of the flange portion.

13. The wheel speed detecting device of claim 1, further comprising:
an insert coupled to the frame and configured to accommodate the second target.

14. The wheel speed detecting device of claim 13, wherein:
an opening is formed at the central portion of the frame, and
a groove, into which a central end portion of the frame surrounding the opening is inserted, is formed in the insert.

15. The wheel speed detecting device of claim 1, wherein:
the first target includes ferrite material, and
the second target includes neodymium material.

16. The wheel speed detecting device of claim 1, wherein at least one opening is formed in a region between the outer circumference of the frame and the central portion of the frame.

17. A wheel bearing assembly, comprising:
an outer ring;
an inner ring relatively rotatable with respect to the outer ring;
a frame fixed on the inner ring so as to surround an outer circumference of the inner ring;
a plurality of targets fixed to the frame; and
a plurality of sensors configured to respectively detect a plurality of magnetic fields induced each of the plurality of targets according to a rotation of the inner ring,
wherein one sensor among the plurality of sensors has a resolution that is higher than that of the other sensor.

18. The wheel bearing assembly of claim 17, wherein:
the plurality of targets comprises a first target disposed along an outer circumference of the frame and a second target disposed at a central portion of the frame,
the second target is concentrically disposed with the inner ring.

19. The wheel bearing assembly of claim 18, further comprising:
a cap fixed on the outer ring so as to surround an outer circumference of the outer ring,
wherein the sensors comprise a first sensor configured to detect a magnetic field induced from the first target; and
a second sensor configured to detect a magnetic field induced from the second target and have a resolution that is higher than that of the first sensor,
wherein a fixing portion for concentrically disposing the second sensor with the second target is formed at a central portion of the cap.

20. The wheel bearing assembly of claim 18, wherein the magnetic field induced from the first target has a frequency that is relatively higher than that of the magnetic field induced from the second target.

* * * * *